United States Patent
Xu et al.

(10) Patent No.: US 11,952,486 B2
(45) Date of Patent: *Apr. 9, 2024

(54) THERMOPLASTIC ELASTOMER COMPOUNDS EXHIBITING RETAINED CLARITY AND IMPROVED SURFACE STRUCTURE

(71) Applicant: PolyOne Corporation, Avon Lake, OH (US)

(72) Inventors: Liang Xu, Vernon Hills, IL (US); Christopher Engel, Cary, IL (US)

(73) Assignee: Avient Corporation, Avon Lake, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/605,998

(22) PCT Filed: Apr. 24, 2018

(86) PCT No.: PCT/US2018/029104
§ 371 (c)(1),
(2) Date: Oct. 17, 2019

(87) PCT Pub. No.: WO2018/200494
PCT Pub. Date: Nov. 1, 2018

(65) Prior Publication Data
US 2020/0140673 A1    May 7, 2020

Related U.S. Application Data

(60) Provisional application No. 62/489,631, filed on Apr. 25, 2017.

(51) Int. Cl.
*C08L 53/00* (2006.01)

(52) U.S. Cl.
CPC ......... *C08L 53/00* (2013.01); *C08L 2205/025* (2013.01); *C08L 2205/05* (2013.01); *C08L 2207/04* (2013.01)

(58) Field of Classification Search
CPC ...... C08L 53/00; C08L 2207/04; C08L 33/12; C08L 83/04; C08L 83/06
See application file for complete search history.

(56) References Cited

U.S. PATENT DOCUMENTS

| | | | |
|---|---|---|---|
| 5,654,366 A | 8/1997 | Furukawa et al. | |
| 8,299,176 B2 | 10/2012 | Guerret et al. | |
| 9,663,651 B2 | 5/2017 | Kim et al. | |
| 2008/0315270 A1 | 12/2008 | Marsh et al. | |
| 2012/0015202 A1 | 1/2012 | Kenens et al. | |

FOREIGN PATENT DOCUMENTS

| | | | |
|---|---|---|---|
| EP | 0728809 B1 | | 1/1998 |
| EP | 1832613 A | | 9/2007 |
| EP | 3251840 A | | 12/2017 |
| JP | 2005-154637 A | | 6/2005 |
| JP | 2006-045418 A | | 2/2006 |
| JP | 2006-335996 A | | 12/2006 |
| JP | 2007-070460 A | * | 3/2007 |
| JP | 4199666 B2 | | 12/2008 |
| JP | 2010-241961 A | | 10/2010 |
| KR | 10-2000-0075768 A | | 12/2000 |
| KR | 10-2017-0039249 A | | 4/2017 |

OTHER PUBLICATIONS

Tong et al (Polymer 41 (2000), 2499-2510). (Year: 2000).*
Tong et al (Macromolecules 2000, 33, 470-479). (Year: 2000).*
Romo-Uribe et al (European Polymer Journal 89 (2017) 101-118). (Year: 2017).*
Riehle et al (European Polymer Journal 101 (2018) 190-201) (Year: 2018).*
Moineau et al (Macromolecules 1999, 32, 8277-8282). (Year: 1999).*
Machine translation into English of JP 2007-070460 A; Mar. 2007; Kondo (Year: 2007).*
Oertel et al.; Acrylic TPE approaching automative; TPE Magazine; Mar. 2010 (Year: 2010) . . . .*
Shin-Etsu; Silicones; downloaded from internet on Jan. 2021.*
European Application No. 18790483.4, Extended European Search Report dated Jan. 12, 2021.
European Application No. 18791836.2, Extended European Search Report dated Dec. 17, 2020.
Kuraray Co., Ltd., Kurarity: A Novel Acrylic Block Copolymer, 1st Ed. (2014).
Evonik Resource Efficiency GmbH, TERGOMER H-Si 2315, Technical Data Sheet (Oct. 2016).

* cited by examiner

*Primary Examiner* — Karuna P Reddy

(74) *Attorney, Agent, or Firm* — David V. Monateri; Emily E. Vlasek

(57) ABSTRACT

Surface structure modification is achieved for an acrylate block copolymer thermoplastic elastomer by the addition of an organo-functional polydimethyl siloxane but also without loss of clarity.

12 Claims, No Drawings

THERMOPLASTIC ELASTOMER COMPOUNDS EXHIBITING RETAINED CLARITY AND IMPROVED SURFACE STRUCTURE

CLAIM OF PRIORITY

This application claims priority from U.S. Provisional Patent Application Ser. No. 62/489,631 filed on Apr. 25, 2017, which is incorporated by reference.

FIELD OF THE INVENTION

This invention relates to thermoplastic elastomers containing functional additives to reduce tackiness and improve surface structure while maintaining substantial clarity.

BACKGROUND OF THE INVENTION

The world of polymers has progressed rapidly to transform material science from wood and metals of the 19$^{th}$ Century to the use of thermoset polymers of the mid-20$^{th}$ Century to the use of thermoplastic polymers of later 20$^{th}$ Century.

In the subset of elastomeric polymers, the same transformational progress has occurred as thermoplastic elastomer (TPE) has supplanted thermoset rubber. Combining the processing advantages of a thermoplastic with the performance advantages of an elastomer has promoted TPE to be ubiquitous in consumer goods, such as gripping surfaces on toothbrushes, as well as a myriad of other end uses in a variety of modern industries.

TPEs are often reliant upon a single macromolecule having blocks of hard and soft segments. The most common TPE is a styrenic block copolymer (SBC) in which, for example, there are two styrenic hard end blocks and an olefinic soft middle block. Examples of this hard-soft-hard TPE structure are styrene-butadiene-styrene (SBS) and its hydrogenated form of styrene-ethylene-butylene-styrene (SEBS).

Clear TPEs have become commercially available. This disclosure concerns the use of polyacrylate block copolymers which contain hard end blocks of polymethylmethacrylate (PMMA) and a soft middle block of polybutyl acrylate (PBA). Thus the macromolecule is polymethylmethacrylate-polybutyl acrylate-polymethylmethacrylate triblock copolymer with an abbreviation for use in this disclosure of "ABC" for acrylate block copolymer.

Unfortunately, current commercial ABCs have a problem of surface tackiness (also identifiable as adhesive stickiness) in final-shape polymer articles made from the ABC. The surface tackiness is especially noticeable in the grades of ABC have a lower Shore A hardness.

Additives to TPEs such as ABCs can improve one property but complicate another property.

SUMMARY OF THE INVENTION

What the art needs is a polymer compound using ABC which can substantially retain the transparency or clarity of the ABC TPE while also reducing the surface tackiness of the polymer articles made from the ABC.

The present invention solves that problem by identifying and using dihydroxypolydimethylsiloxane, an organo-functional PDMS which in small concentrations removes the surface tackiness found when using ABC but also without compromising the clarity of the polymer article made from the mixture of the ABC and the organo-functional PDMS.

Retention of substantial clarity is a first principle for this invention, so long as the surface tackiness is also substantially abated. As with many additives which are directed to improving one property, the addition of an additive cannot compromise a different property which was the reason for selection the TPE initially.

Haze is a measure of loss of clarity. It is a quantitative assessment using the test method of ASTM D1003.

Surface tackiness is a qualitative assessment of how the surface feels to the touch of a human finger. That initial qualitative assessment can be confirmed by measuring quantitatively the kinetic coefficient of friction (COF) in a kinetic state using the test methods of ASTM D1894.

One aspect of the invention is a thermoplastic elastomer compound, comprising: polymethylmethacrylate-polybutyl acrylate-polymethylmethacrylate triblock copolymer and hydroxy functional polydimethylsiloxane, wherein the compound has a haze of less than about 10% when tested using ASTM D1003 and a kinetic coefficient of friction of less than about 0.65 when tested using ASTM 1894.

Another aspect of the invention is a polymer article of the above compound. Another aspect is the method of forming the polymer article into its final shape.

Features of the invention will become apparent with reference to the following embodiments.

EMBODIMENTS OF THE INVENTION

TPE Matrix

Polymethylmethacrylate-polybutyl acrylate-polymethylmethacrylate triblock copolymer is the matrix of TPE useful in this invention. One of the manufacturers of this ABC, Kuraray America, Inc., reports the TPE to be transparent, weather resistant, UV resistant, and having low odor, low melt viscosity, and compatibility with other polar plastics.

Starting from the premise that the end use polymer article has at least a component which needs a transparent polymer having elastomeric properties, this ABC is the starting point for compounding the mix of ingredients because its haze is less than 10 when measured using ASTM D1003.

Multiple grades of this ABC are available from Kuraray under the Kurarity™ brand, differentiated at least by Shore A hardness. For example, the hardnesses of grades LA 2250 and LA 4285 are 62 Shore A and 96 Shore A, respectively. A blend of these two grades can tailor the overall Shore A hardness to any value between 62 and 96.

Functionalized PDMS

Polydimethylsiloxane (PDMS) is very well known in polymer chemistry for its versatility. Also called "silicone", PDMS is known to be optically clear also. It is believed that merely melt mixing the ABC TPE described above and PDMS would result in loss of clarity. Therefore, the PDMS needs to be functionalized, with dihydroxypolydimethylsiloxane being the currently preferred functionalized version of PDMS.

There are many commercial grades of a hydroxyl terminated PDMS. For use here, the number average molecular weight (Mn) can range from about 100 to about 300,000 and preferably from about 500 to about 150,000. Also, the viscosity (mPa·sec at 25° C.) can range from about 5 to about 1000 and preferably from about 50 to about 500.

Currently preferred is Tegomer® H-Si 2315 hydroxy functional polydimethyl siloxane from Evonik. Its viscosity is about 90 mPa·sec at 25° C. Its hydroxyl value calculated on non-volatile content is about 48 mg KOH/g. Its acid value calculated on non-volatile content is about 0.5 mg KOH/g. Evonik advertises the use of Tegomer® H-Si 2315 hydroxy functional polydimethyl siloxane to be a co-binder.

Optional Additives

The compound of the present invention can include other conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; dispersants; fillers and extenders; fire and flame retardants and smoke suppressants; hardness adjusters; initiators; lubricants; micas; mold release agents; pigments, colorants and dyes; oils and plasticizers; processing aids; release agents; silanes, titanates and zirconates; slip and anti-blocking agents; stabilizers; stearates; ultraviolet light absorbers; viscosity regulators; waxes; and combinations of them. Of these optional additives, UV absorbers, anti-oxidants, and mold release agents are often used.

Generally, minor amounts of such additives provide improvement of performance to the compound during processing with the other ingredients in the polymer resin or in performance of the polymeric molded article after manufacturing. One skilled in the art without undue experimentation can determine the appropriate concentration.

Table 1 shows the acceptable, desirable, and preferable ranges of ingredients for the compound of the present invention, all expressed in parts per hundred of TPE polymer. The compound can comprise, consist essentially of, or consist of the following ingredients. Any number between the ends of the ranges is also contemplated as an end of a range, such that all possible combinations are contemplated within the possibilities of Table 1 as candidate compounds for use in this invention.

TABLE 1

Ranges of Ingredients

| Ingredient (PHR) | Acceptable | Desirable | Preferable |
|---|---|---|---|
| ABC TPE (single or blends) | 100 | 100 | 100 |
| Functionalized PDMS | 0.05-0.28 | 0.1-0.25 | 0.1-0.2 |
| Optional UV Absorber | 0-0.5 | 0.1-0.3 | 0.2 |
| Optional Mold Release Agent | 0-0.2 | 0.05-0.15 | 0.1 |
| Optional Anti-oxidant | 0-0.2 | 0.05-0.15 | 0.1 |

Processing

The preparation of compounds of the present invention is uncomplicated. The compound of the present invention can be made in batch or continuous operations.

Mixing in a continuous process typically occurs in an extruder that is elevated to a temperature that is sufficient to melt the polymer matrix with addition at the head of the extruder. Extruder speeds can range from about 50 to about 500 revolutions per minute (rpm), and preferably from about 300 to about 500 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

USEFULNESS OF THE INVENTION

The substantially clear ABC TPE compound disclosed here can be made into any extruded, molded, spun, casted, calendered, thermoformed, or 3D-printed article. Non-limiting examples of candidate end uses for such finally-shaped TPE articles are listed in summary fashion below.

Appliances: Refrigerators, freezers, washers, dryers, toasters, blenders, vacuum cleaners, coffee makers, and mixers;

Consumer Goods: Power hand tools, rakes, shovels, lawn mowers, shoes, boots, golf clubs, fishing poles, and watercraft;

Electrical/Electronic Devices: Printers, computers, business equipment, LCD projectors, mobile phones, connectors, chip trays, circuit breakers, and plugs;

Healthcare: Wheelchairs, beds, testing equipment, analyzers, labware, ostomy, IV sets, wound care, drug delivery, inhalers, toothbrushes, safety razors, and packaging;

Industrial Products: Containers, bottles, drums, material handling, valves, and safety equipment;

Consumer Packaging: Food and beverage, cosmetic, detergents and cleaners, personal care, pharmaceutical and wellness containers;

Transportation: Automotive aftermarket parts, bumpers, window seals, instrument panels, consoles; and Wire and Cable: Cars and trucks, airplanes, aerospace, construction, military, telecommunication, utility power, alternative energy, and electronics.

Articles with need for gripping by the human hand lead the most likely candidates to be made from the compounds of the present invention. From hand tools to handle bars, from pill containers to ice chests, the combination of performance properties of clarity with surface smoothness without tackiness allows for the plastic article designer to utilize formulations contemplated by this disclosure for a limitless set of polymeric end use products.

EXAMPLES

Table 2 shows the commercial source of the ingredients for all Examples 1-4 and Comparative Examples A-E. Tables 3 and 4 report the formulations, the processing of the formulations to make extruded pellets and then to mold into sample plaques for testing, and the results of experimental results of that testing.

The samples of the compounds were tested for tackiness and surface blooming, two unacceptable properties for the ABC TPE to have. Tackiness is a surface feel, which one can feel using human fingers. Blooming is a visual observation on the surface, which can also be checked by rubbing human fingers on the surface of the TPE article.

Blooming is a common phenomenon where there are additives in the compound, especially an additive used to adjust surface properties. Blooming is not good for TPE surfaces because it can cause surface smearing when rubbing human fingers on the surface. Comparative Examples A and D have no surface modifier and therefore do not bloom. But also, when the Tegomer surface modifier is added, there still is no blooming. That result is unexpected, confirmed by the surprising extent of reduction in kinetic COF surface properties.

TABLE 2

Ingredients

| Name | Purpose | Source |
| --- | --- | --- |
| Kurarity ™ LA 4285 Polymethylmethacrylate-polybutyl acrylate-polymethylmethacrylate triblock copolymer | TPE matrix | Kuraray |
| Kurarity ™ LA 2250 Polymethylmethacrylate-polybutyl acrylate-polymethylmethacrylate triblock copolymer | TPE matrix | Kuraray |
| Tinuvin ™ 234 Phenol, 2-(2H-benzotriazol-2-yl)-4,6-bis(1-methyl-1-phenylethyl) | UV absorber | BASF |
| Synpro ™ S1200 Zinc Stearate | Mold release | Valtris Special Chemicals |
| Irgafos ™ 168 Tris(2,4-ditert-butyl phenyl) phosphite | Antioxident | BASF |
| Tegomer ® H-Si 2315 Dihydroxypolydimethylsiloxane | Surface Modifier | Evonik |

TABLE 3

Recipes, Preparation, and Properties

| Ingredient (PHR) | A | 1 | 2 | B | C |
| --- | --- | --- | --- | --- | --- |
| LA 2250 | 60 | 60 | 60 | 60 | 60 |
| LA 4285 | 40 | 40 | 40 | 40 | 40 |
| Tinuvin 234 | 0.2 | 0.2 | 0.2 | 0.2 | 0.2 |
| Synpro S1200 | 0.1 | 0.1 | 0.1 | 0.1 | 0.1 |
| Irgafos 168 | 0.1 | 0.1 | 0.1 | 0.1 | 0.1 |
| Tegomer H-Si 2315 | 0 | 0.1 | 0.2 | 0.3 | 0.5 |
| Mixing Equipment | Twin Screw Extruder | | | | |
| Mixing Temp. | 188° C. | | | | |
| Mixing Speed | 500 rpm | | | | |
| Order of Addition of Ingredients | All together | | | | |
| Form of Product After Mixing | Pellets | | | | |
| Molding machine Temperature | Fanuc Roboshot Injection Molding Machine 200° C. | | | | |
| Sample Size | 15.24 cm × 12.7 cm × 0.30 cm (6" by 5" by 0.12") | | | | |
| Shore A Hardness (ASTM D2240, 10 s delay) | 74 | 76 | 74 | 74 | 75 |
| Specific gravity (ASTM D792) | 1.08 | 1.08 | 1.08 | 1.09 | 1.09 |
| Tensile Strength, psi (ASTM D412, Die C) | 1676 | 1621 | 1676 | 1670 | 1745 |
| Elongation, % (ASTM D412, Die C) | 279 | 261 | 298 | 308 | 336 |
| Kinetic COF (ASTM D1894) | 1.01 | 0.62 | 0.32 | 0.36 | 0.35 |
| Haze (ASTM D1003) | 6 | 4 | 8 | 18 | 56 |
| Clarity (Visual) | Clear | Clear | Clear | Hazy | Hazy |
| Surface Feel (Tackiness) | Some | Smooth | Smooth | Smooth | Smooth |
| Surface Blooming, after 168 hrs. (Visual) | No | No | No | No | No |

TABLE 4

Recipes, Preparation, and Properties

| Ingredient (PHR) | D | 3 | 4 | E |
| --- | --- | --- | --- | --- |
| LA 2250 | 75 | 75 | 75 | 75 |
| LA 4285 | 25 | 25 | 25 | 25 |
| Tinuvin 234 | 0.2 | 0.2 | 0.2 | 0.2 |
| Synpro S1200 | 0.1 | 0.1 | 0.1 | 0.1 |
| Irgafos 168 | 0.1 | 0.1 | 0.1 | 0.1 |
| Tegomer H-Si 2315 | 0 | 0.1 | 0.2 | 0.3 |
| Mixing Equipment | Twin Screw extruder | | | |
| Mixing Temp. | 188° C. | | | |
| Mixing Speed | 500 rpm | | | |
| Order of Addition of Ingredients | All together | | | |
| Form of Product After Mixing | Pellets | | | |
| Molding machine Temperature | Fanuc Roboshot Injection Molding Machine 200° C. | | | |
| Sample Size | 15.24 cm × 12.7 cm × 0.30 cm (6" × 5" × 0.12") | | | |
| Shore A Hardness (ASTM D2240, 10 s delay) | 68 | 67 | 66 | 67 |
| Specific gravity (ASTM D792) | 1.08 | 1.09 | 1.07 | 1.07 |
| Tensile Strength, psi (ASTM D412, Die C) | 1386 | 1421 | 1465 | 1231 |
| Elongation, % (ASTM D412, Die C) | 334 | 261 | 303 | 227 |
| Kinetic COF (ASTM D1894) | 1.09 | 0.60 | 0.61 | 0.63 |
| Haze (ASTM D1003) | 5 | 5 | 9 | 20 |
| Clarity (Visual) | Clear | Clear | Clear | Hazy |
| Surface Feel (Tackiness) | Some | Smooth | Smooth | Smooth |
| Surface Blooming, after 168 hrs. (Visual) | No | No | No | No |

Tables 3 and 4 differ in respect of the ratio of the two ABC TPEs having different Shore A Hardness values, as identified above. For the formulations of Table 3, the ratio was 1.5:1 Softer:Harder Shore A, and for the formulations of Table 4, the ratio was 3:1 Softer:Harder Shore A. By comparison of the physical properties of the results in Tables 3 and 4, a person having ordinary skill in the art (PHOSITA) without undue experimentation can adjust the 100 PHR of TPE between the two ABC candidates to reach any Shore A hardness value between 62 and 96.

Comparative Examples A and D were controls, wherein the only difference in Tables 3 and 4 was the amount of hydroxy-functional PMDS present as a surface modifier. As noted above, both Comparative Examples A and D showed some surface tackiness, which was eliminated with the addition of hydroxy-functional PMDS in increasing amounts starting with 0.1 PHR. Comparative Examples B, C, and E demonstrated that the addition hydroxy-functional PMDS at 0.3 PHR and above resulted in hazy samples, indicating that the reduction of surface tackiness needed to be balanced against the need for clarity, the reason for which the ABC TPE was created.

Examples 1-4 demonstrated addition of less than 0.3 PHR of hydroxy-functional PMDS resulted in both an acceptable level of clarity and an acceptable surface structure. Any addition of 0.29 or less, in one-hundredths of PHR down to 0.1 PHR is contemplated as acceptable in this invention, without listing the specific numerals.

Indeed, with clarity as measured by Haze being essentially unaffected (no perceived difference in percentage Haze between Comparative Examples A and D and Examples 1 and 2 and Examples 3 and 4, respectively), the surface structure lost its tackiness with the addition of about 0.1 to about 0.2 PHR of hydroxy-functional PMDS.

Unexpectedly, the kinetic COF property was much superior in each of Examples 1-4 as compared with Comparative Examples A and D, between 30 and 60% reduction.

From the results of the experiments, a successful thermoplastic elastomer compound can have up to about 10% and preferably up to about 5% haze and less than about 0.65 and preferably less than about 0.40 kinetic COF.

The invention is not limited to the above embodiments. The claims follow.

What is claimed is:

1. A thermoplastic elastomer compound, comprising:
   (a) polymethylmethacrylate-polybutyl acrylate-polymethylmethacrylate triblock copolymer,
   (b) a hydroxy functional polydimethylsiloxane comprising dihydroxypolydimethylpolysiloxane, and
   (c) a mold release agent;
   wherein the polymethylmethacrylate-polybutyl acrylate-polymethylmethacrylate triblock copolymer forms a polymer matrix and the hydroxy functional polydimethylsiloxane is incorporated within the polymer matrix by mixing the hydroxy functional polydimethylsiloxane and the polymethylmethacrylate-polybutyl acrylate-polymethylmethacrylate triblock copolymer at a temperature sufficient to melt the polymethylmethacrylate-polybutyl acrylate-polymethylmethacrylate triblock copolymer,
   the hydroxy functionalized polydimethylsiloxane is present in the compound at 0.1 to 0.2 parts per one hundred parts of polymethylmethacrylate-polybutyl acrylate-polymethylmethacrylate triblock copolymer,
   wherein the mold release agent is present in the compound at 0.05 to 0.2 parts per one hundred parts of polymethylmethacrylate-polybutyl acrylate-polymethylmethacrylate triblock copolymer;
   polymethylmethacrylate-polybutyl acrylate-polymethylmethacrylate triblock copolymer includes a first polymethylmethacrylate-polybutyl acrylate-polymethylmethacrylate triblock copolymer that has a Shore A hardness of 62 and a second polymethylmethacrylate-polybutyl acrylate-polymethylmethacrylate triblock copolymer that has a Shore A hardness of 96;
   the compound includes 60 PHR to 75 PHR of the first polymethylmethacrylate-polybutyl acrylate-polymethylmethacrylate triblock copolymer and the compound includes 25 PHR to 40 PHR of the second polymethylmethacrylate-polybutyl acrylate-polymethylmethacrylate triblock copolymer; and
   the compound has a haze of less than about 10% when tested using ASTM D1003 and a kinetic coefficient of friction of less than about 0.65 when tested using ASTM D1894.

2. The compound of claim 1, wherein the dihydroxypolydimethylpolysiloxane has a number average molecular weight (Mn) of from about 100 to about 300,000 and a viscosity of from about 5 to about 1000 mPa·sec at 25° C.

3. The compound of claim 2, wherein the hydroxy functional polydimethylsiloxane has a viscosity of about 90 mPa·sec at 25° C. and a hydroxyl value calculated on non-volatile content of about 48 mg KOH/g.

4. The compound of claim 1, wherein the compound further comprises one or more optional additives selected from the group consisting of adhesion promoters; biocides; anti-fogging agents; anti-static agents; dispersants; fillers and extenders; fire and flame retardants and smoke suppressants; hardness adjusters; initiators; lubricants; micas; colorants; oils and plasticizers; processing aids; silanes, titanates and zirconates; slip and anti-blocking agents; stabilizers; ultraviolet light absorbers; viscosity regulators; and waxes.

5. The compound of claim 1, wherein the haze is less than 5% when tested using ASTM D1003.

6. The compound of claim 1, wherein the mold release agent is present at 0.05 to 0.15 parts per one hundred parts of polymethylmethacrylate-polybutyl acrylate-polymethylmethacrylate triblock copolymer.

7. A polymeric article, comprising a compound of claim 1.

8. The polymeric article of claim 7, wherein the article is in final molded, extruded, thermoformed, calendered, spun, casted, or 3D-printed shape.

9. The polymeric article of claim 7, wherein the article is a pellet.

10. A method of using the compound of claim 1 to form a polymer article, wherein the method comprises the step of shaping the compound to form the article, wherein shaping is selected from the group consisting of molding, extrusion, thermoforming, calendering, spinning, casting, or 3D-printing.

11. A method of using the compound of claim 1 to form a polymer article, wherein the method comprises the step of shaping the compound to form the article, wherein shaping is selected from the group consisting of extrusion, thermoforming, calendering, spinning, casting, or 3D-printing.

12. A method of using the compound of claim 1 to form a polymer article, wherein the method comprises the step of shaping the compound to form the article, wherein shaping is performed by injection molding.

* * * * *